Oct. 22, 1963    K. R. OLIVER, JR., ET AL    3,107,523

TENSILE TESTING SPECIMEN CLAMP

Filed March 31, 1960

INVENTORS
KENNETH R. OLIVER, JR.
HENRY L. McKIMMY,
BY
ATTORNEYS

United States Patent Office 3,107,523
Patented Oct. 22, 1963

3,107,523
TENSILE TESTING SPECIMEN CLAMP
Kenneth R. Oliver, Jr., and Henry L. McKimmy, both of Newport News, Va., assignors to The Dow Chemical Co., Midland, Mich., a corporation of Delaware
Filed Mar. 31, 1960, Ser. No. 18,991
4 Claims. (Cl. 73—103)

This invention relates generally to tensile testing apparatus, and it is particularly directed to an improved tensile testing specimen clamp for gripping specimens such as single fibers which are to be tested, and holding them securely to prevent slippage between the specimen and the clamp, without deformation of the test specimen.

The usefulness of tensile tests is dependent upon the accuracy of the measurements obtainable by such tests. One of the major characteristics to be determined by tensile tests is the elongation of the specimen undergoing tests and the relationship of this elongation to the tension applied to the specimen. It is highly important therefore that the equipment used in performing the tests be capable of giving an accurate reading of the actual elongation produced by the application of the tensile force on the specimen.

When a specimen undergoing test has a relatively small diameter, it is generally impractical to mark any portions of the specimen so as to determine whether or not slippage has occurred between the specimen and the clamp holding the specimen during the tensile test. As a rule, tensile tests of small diameter specimens, such as single fibers, are made on specimens of a predetermined gauge length, and the percentage elongation per unit of length is easily obtainable from the simple relationship of the total elongation to the original gauge length. Such a determination presupposes that the specimen has been held firmly by the testing equipment and that no slippage has occurred therebetween during the tests.

It has been found that it is extremely difficult to obtain a clamp which will securely hold a specimen such as a single fiber without slippage therebetween when tension is applied to the test specimen, unless the specimen is clamped firmly between gripping jaws. Various arrangements have been tried wherein the single fibers were adhered to a holder by a suitable adhesive, but in most instances it has been found that some fibers cannot properly be held in this manner. Furthermore, adhesives which are suitable for one type of fiber are entirely unsatisfactory for other types of fibers, and consequently many adhesives must be tried for each different fiber in order to obtain one which will satisfactorily hold each new type of specimen.

The use of gripping jaws would appear to be a solution to this problem, but it has been found that, unless extreme care is used, in most instances the gripping jaws will deform that part of a specimen which is held between the jaws. Such deformation often will result in a weakening of the deformed part of the specimen held by the jaws and, when the tension on the specimen becomes sufficiently great, it will stretch and even break where it has been deformed, usually at or near the point where it enters the jaws, and the test will, therefore, be inaccurate and substantially worthless.

The present improved specimen clamp avoids the necessity for a continual search for new adhesives and the extensive testing that each new specimen fiber requires in order to establish the usefulness of any particular adhesive, and also avoids the difficulties encountered with clamping techniques of the past for holding specimens during tensile testing. In accordance with the present invention, a tensile testing specimen is securely held by clamping jaws which are made of a solid resiliently deformable material having the characteristic of being deformable by a specimen undergoing test when the jaws are clamped securely around the specimen, and having a coefficient of friction relative to the test specimen so as to prevent slippage of the specimen without deformation of the specimen by the clamping jaws. This is obtained by securely clamping the jaws around a test specimen through a gripping jaw holder, which is secured in any convenient manner to the tensioning parts of a tensile testing apparatus.

It is an object of this invention to provide an improved tensile testing specimen clamp for securely holding a specimen undergoing test without deformation of the specimen.

Another object of this invention is to provide an improved specimen fiber clamp for securely holding a single specimen during a tensile test against slippage with reference to the clamp and without deformation of the specimen.

A further object of this invention is to provide an improved clamp for holding a specimen during a tensile test wherein the jaws of the clamp which secure the specimen are deformable rather than the specimen and which jaws are readily replaceable.

Further objects and advantages of this invention will become apparent from the following description referring to the accompanying drawing, and the features of novelty which characterize this invention will be pointed out with particularity in the claims appended to and forming a part of this specification.

Figure 1:
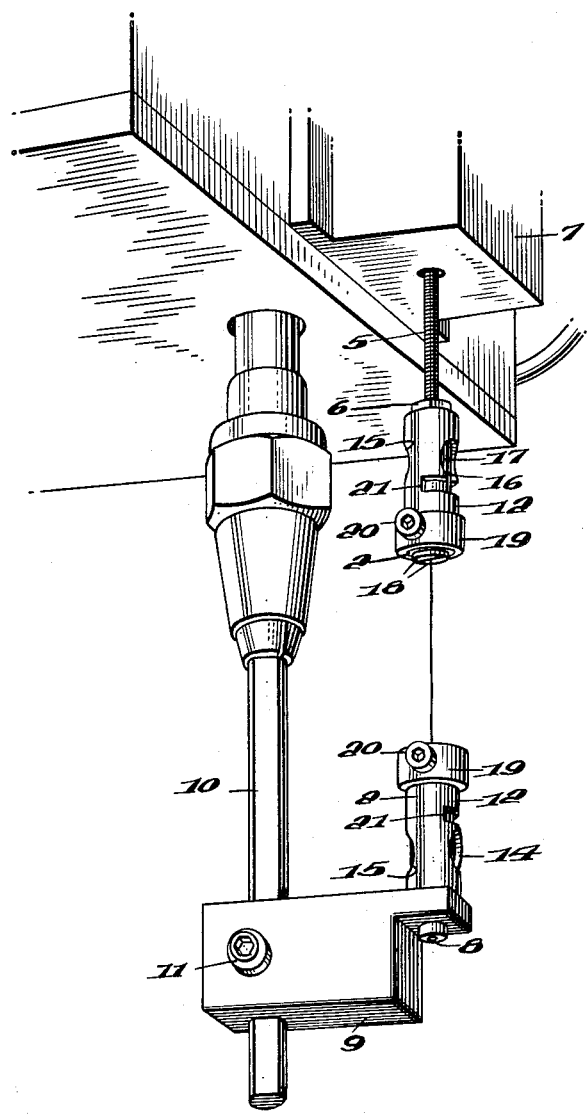
FIG. 1 is a perspective view illustrating a pair of specimen clamps mounted on a part of a tensile testing device.
Figure 2:
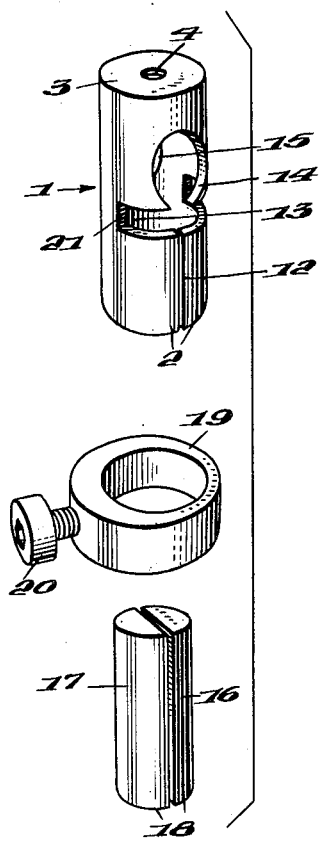
FIG. 2 is an exploded perspective view of the upper specimen clamp shown in FIG. 1.

Referring to the drawing, an improved tensile testing specimen clamp embodying the present invention is shown illustrating its applicability to a tensile testing device for determining the tensile characteristics of a single fiber. The present invention may be utilized in connection with any suitable tensile testing device and, in the illustrated embodiment, the device is of the type which is particularly useful for testing single fibers or single strands of relatively easily deformable material. In testing such material, two very important features of a clamp are that it must securely hold the deformable fiber to prevent slippage, which would result in an erroneous measurement of its elongation under tension; and, since many specimens, such as synthetic plastic fibers, have an inherent resiliency which makes the fiber readily deformable, the jaws of the clamp which hold the fiber should be deformable to the shape of the fiber rather than flattening or deforming the fiber when it is clamped in position.

In accordance with the illustrated embodiment of the invention, the tensile testing fiber clamp comprises a gripping jaw holder 1 having substantially cylindrical hollow sides 2, which are integrally formed with and extend longitudinally from a base 3 which connects together one end of the two sides of the jaw holder. The base 3 is adapted to be secured in any suitable manner to the elements of the tensile tester which are adapted to exert tension on a specimen and to measure this tension. The base 3 thus conveniently may be secured to the tensile testing equipment by providing a tapped hole 4 substantially centrally of the base and screwed to parts of the testing apparatus. As shown in FIG. 1, a shank 5 of a strain gauge connecting rod may simply be screwed into the tapped hole 4 of the jaw holder base 3, and a lock nut 6 can be screwed down against the face of the base 3 to securely fasten the clamp to the strain gauge 7.

Where the clamp is used as the element which secures the specimen to the tension applying member of the tensile testing device, a suitable screw 8 can be threadedly engaged in the tapped hole 4 in the base 3 of the jaw holder, so as to fasten the clamp securely to an adaptor block 9, which conveniently may be adjustably mounted on a suitable elongation yoke bar 10 in any desired position by a setscrew 11.

The clamp jaw holder comprising the two sides 2 and the base 3 preferably are formed of suitably flexible material, such as steel, and the two sides 2 are substantially mirror duplicates which are formed by a pair of substantially diametrically opposed slits 12 and 13, which longitudinally bifurcate the holder 1 into two gripping side parts and provide for transversely flexibly permitting movement of these two parts towards one another. The slits preferably terminate in circular or curved openings 14 and 15 which add to the flexibility of the sides of the holder by reducing the section of material between these circular openings and also more equally distributing the stress around the circumference of such openings.

In order to provide the desired characteristics to the clamping jaws, the jaws preferably are formed as two substantially semicylindrical elements 16 and 17 made of substantially rigid solid, yet resiliently deformable, material. These can very readily be made of a plastic having the characteristic of being more deformable than a test specimen when such a test specimen is clamped between the jaws, and of being sufficiently rigid and having a coefficient of friction relative to the test specimen to prevent relative slippage therebetween without deformation of the test specimen when the specimen is placed under tension in a tensile tester.

Such clamping jaws can readily be formed from a cylindrical member having a diameter slightly less than the inner diameter of the hollow sides 2 of the jaw holder 1, and securing such a cylindrical member within the jaw holder in any suitable manner, as by adhesively securing it therein with any suitable adhesive. The cylindrical member then can readily be slit or cut longitudinally its full length through the slits 12 and 13 of the jaw holder, thus assuring a complete correspondence of the spacing between the jaws 16 and 17 with the slits 12 and 13 which separate the sides 2 of the jaw holder. When jaws are made in this manner, it is preferable that the cylindrical member from which the jaws are formed should have a length substantially equal to the length of the slits which separate the sides 2, and, in any case, it should not exceed the length of the slits plus the diameter of the circular openings at the ends of the slits, so as to assure a complete severance of the cylindrical member into two jaws.

It is highly desirable that the pressure exerted by the clamping jaws on a test specimen should be such as to prevent slippage or elongation especially of that part of the specimen within the jaws immediately adjacent to their outer faces 18. In order to assure against such slippage or elongation and in order to exert the desired holding force upon the entire length of test specimen held within the jaws, a clamping ring 19 having an inner diameter slightly greater than the external diameter of the cylindrical sides 2 of the jaw holder when these jaws are in extended position, is adapted to be slipped over the outer ends of the holder sides 2. A clamping screw 20 threadedly engages a tapped opening in one side of the ring 19 and is adapted to be screwed against the outer surface of one of the jaw holder sides 2, so as to clamp the ends of the two sides 2 between the inner end of the screw 20 and the diametrically opposite inner side of the clamping ring 19. In this manner, the two sides 2 of the jaw holder are adapted to be evenly biased towards each other so as firmly to clamp together the two jaws 16 and 17.

In testing single fibers in a tensile tester provided with a fiber clamp made in accordance with this invention, it is not necessary in all instances to have a fiber long enough so that it will extend longitudinally the full length of the jaws 16 and 17, but it will be found advantageous in many instances to use a test specimen which is sufficiently long to extend substantially the full length of the jaws, as this provides for a larger gripping area between the specimen and the clamp jaws. This becomes particularly important where the fiber has a very smooth, slick, high finish.

Figure 3:
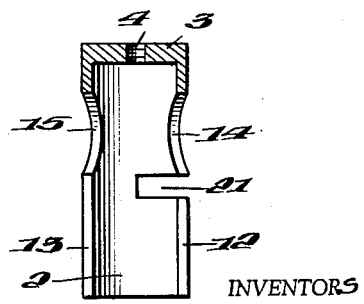
FIG. 3 is a longitudinal sectional view taken along a plane through the slits of the jaw holder of the clamp shown in FIGS. 1 and 2.

In order to facilitate the mounting of fibers in the clamp, the jaw holder 1 may be formed with a transversely extending slot 21 across one side of the holder, preferably between the inner end of one of the slits and the circular opening at the end of the slit. Such a slot may aid in properly locating the test specimen substantially centrally in the jaws, and, when used, preferably extends substantially halfway through the cylinder forming the jaw holder 1, as can best be seen in FIG. 3.

A clamp made in accordance with this embodiment of the present invention has the advantage of being relatively light and small so that it does not load or otherwise appreciably affect the measurements indicated by a strain gauge, and yet provides for the application of sufficient pressure upon a test specimen, and especially at the outer ends of the jaw faces where the pressure is most important. It also has the advantage of having clamping jaws which are readily replaceable in case they become worn or permanently deformed, or simply because the material of which the jaw faces are made should be changed for testing different types of materials.

While a particular embodiment of this invention has been illustrated and described, modifications thereof will occur to those skilled in the art. It is to be understood, therefore, that this invention is not to be limited to the particular arrangement and structure disclosed, and it is intended in the appended claims to cover all modifications within the spirit and scope of this invention.

What is claimed is:

1. A tensile testing fiber specimen clamp comprising a gripping jaw holder having substantially cylindrical hollow sides and a base at one end of said sides, said base being constructed for securing the clamp to tensile testing equpment, said holder sides having a pair of substantially diametrically opposed slits longitudinally thereof bifurcating said sides into two gripping side parts and providing for flexibly transversely moving said side parts together, said holder having opposed substantially enlarged openings at the inner ends of said slits providing substantial reductions in the sections of said sides therebetween, a pair of substantially semicylindrical jaws secured one within each of said holder side parts, said jaws being made of a substantially rigid solid resiliently deformable plastic material having the characteristic of being readily deformable by a test specimen fiber when clamped together and sufficiently rigid with a coefficient of friction relative to the test specimen to prevent relative slippage therebetween without deformation of the test specimen, and means comprising a clamping ring and tightening screw for exerting a force clamping together said jaws through said jaw holder sides.

2. A tensile testing fiber specimen clamp comprising a gripping jaw holder having substantially cylindrical hollow sides and a base at one end of said sides, said base being constructed for securing the clamp to tensile testing equipment, said holder sides having a pair of substantially diametrically opposed slits longitudinally thereof terminating in curved enlargements and bifurcating said sides into two gripping side parts and providing for flexibly transversely moving said side parts together, a pair of substantially semicylindrical jaws secured one within each of said holder side parts, a transverse slot adjacent to the inner end of one of said slits extending into both of said side parts for facilitating placing a specimen between said jaws, said jaws being made of a substantially rigid solid resiliently deformable plastic material having the characteristic of being readily deformable by a test specimen fiber when clamped together and sufficiently rigid with a coefficient of friction relative to the test specimen to prevent relative slippage therebetween without deformation of the test specimen, and means comprising a clamping ring and tightening screw for exerting a force clamping together said jaws through said jaw holder sides.

3. A tensile testing specimen clamp comprising a gripping jaw holder having longitudinally extending transversely arcuate hollow sides with longitudinal edges spaced apart by a pair of longitudinal slits separating said sides into two gripping side parts and a base connecting together one end of said sides, said base being constructed for securing the clamp to tensile testing equipment, said holder having opposed substantially enlarged openings at the inner ends of said slits providing substantial reductions in the sections of said sides therebetween, a pair of substantially semicylindrical jaws secured one within each of said jaw holder sides, said jaws being made of a solid resiliently deformable material having the characteristic of being readily deformable by a test specimen when clamped together and sufficiently rigid with a coefficient of friction relative to the test specimen to prevent relative slippage therebetween without deformation of the test specimen, and means for biasing said jaw holder sides toward one another for exerting a force clamping together said jaws.

4. A tensile testing specimen clamp comprising a gripping jaw holder having longitudinally extending transversely arcuate hollow sides with longitudinal edges spaced apart by a pair of longitudinal slits separating said sides into two gripping side parts and a base connecting together one end of said sides, said base being constructed for securing the clamp to tensile testing equipment, said holder having opposed substantially enlarged openings at the inner ends of said slits providing substantial reductions in the sections of said sides therebetween, a pair of substantially semicylindrical jaws secured one within each of said holder sides, said jaws being made of a substantially solid resiliently deformable material having the characteristic of being readily deformable by a test specimen when clamped together and sufficiently rigid with a coefficient of friction relative to the test specimen to prevent relative slippage therebetween, and means comprising a clamping ring arranged around said jaw holder sides and a tightening screw for exerting a force biasing said jaw holder sides toward one another for clamping together said jaws through said jaw holder sides.

References Cited in the file of this patent
UNITED STATES PATENTS

| | | |
|---|---|---|
| 2,043,442 | McNeil | June 9, 1936 |
| 2,584,282 | Nelson | Feb. 5, 1952 |
| 2,608,857 | Torre et al. | Sept. 2, 1952 |
| 2,676,809 | Smith | Apr. 27, 1954 |